(12) United States Patent
Creeth et al.

(10) Patent No.: US 9,005,828 B2
(45) Date of Patent: *Apr. 14, 2015

(54) REDOX FUEL CELLS WITH A CATHOLYTE SOLUTION CONTAINING A POLYOXOMETALLATE

(75) Inventors: Andrew Martin Creeth, Chester (GB); Andrew Robert Potter, Liverpool (GB)

(73) Assignee: Acal Energy Limited, Cheshire (GB)

( * ) Notice: Subject to any disclaimer, the term of this patent is extended or adjusted under 35 U.S.C. 154(b) by 1358 days.

This patent is subject to a terminal disclaimer.

(21) Appl. No.: 12/294,320

(22) PCT Filed: Mar. 23, 2007

(86) PCT No.: PCT/GB2007/050151
§ 371 (c)(1),
(2), (4) Date: May 13, 2009

(87) PCT Pub. No.: WO2007/110663
PCT Pub. Date: Oct. 4, 2007

(65) Prior Publication Data
US 2009/0317668 A1    Dec. 24, 2009

(30) Foreign Application Priority Data

Mar. 24, 2006 (GB) .................................. 0605878.8

(51) Int. Cl.
*H01M 8/04* (2006.01)
*H01M 8/06* (2006.01)
(Continued)

(52) U.S. Cl.
CPC ............ *H01M 8/188* (2013.01); *H01M 4/8605* (2013.01); *H01M 4/9016* (2013.01);
(Continued)

(58) Field of Classification Search
USPC .................................. 429/417, 447, 492, 502
See application file for complete search history.

(56) References Cited

U.S. PATENT DOCUMENTS 3,152,013 A    10/1964    Juda
3,279,949 A    10/1966    Schaefer et al.
(Continued)

FOREIGN PATENT DOCUMENTS

EP    0 043 647    1/1982
EP    0 228 168    11/1986
(Continued)

OTHER PUBLICATIONS

S.R. Alley and W. Henderson, "Synthesis and characterization of ferrocenyl-phosphonic and -arsonic acids," J. Organomet. Chem., 637-639, 2001, 216-229.
(Continued)

*Primary Examiner* — Sean P Cullen
(74) *Attorney, Agent, or Firm* — Knobbe Martens Olson & Bear LLP

(57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least about 0.075M of the said polyoxometallate.

20 Claims, 6 Drawing Sheets

(51) Int. Cl.
  *H01M 8/10* (2006.01)
  *H01M 8/18* (2006.01)
  *H01M 8/20* (2006.01)
  *H01M 8/22* (2006.01)
  *H01M 4/86* (2006.01)
  *H01M 4/90* (2006.01)

(52) U.S. Cl.
  CPC .......... *H01M 8/1023* (2013.01); *H01M 8/1025* (2013.01); *H01M 8/1027* (2013.01); *H01M 8/1032* (2013.01); *H01M 8/1039* (2013.01); *H01M 8/20* (2013.01); *H01M 8/1009* (2013.01); *H01M 2300/0082* (2013.01); *Y02E 60/521* (2013.01); *Y02E 60/528* (2013.01)

(56) References Cited

U.S. PATENT DOCUMENTS

| | | |
|---|---|---|
| 3,294,588 A | 12/1966 | Beltzer et al. |
| 3,360,401 A | 12/1967 | Grasselli et al. |
| 3,540,933 A | 11/1970 | Boeke |
| 3,607,420 A | 9/1971 | Cutler |
| 4,048,383 A | 9/1977 | Clifford |
| 4,396,687 A * | 8/1983 | Kummer et al. ............ 429/417 |
| 5,250,158 A | 10/1993 | Kaneko et al. |
| 5,298,343 A | 3/1994 | Savadogo et al. |
| 5,660,940 A | 8/1997 | Larsson et al. |
| 5,683,829 A | 11/1997 | Sarangapani |
| 5,958,616 A | 9/1999 | Salinas et al. |
| 6,054,580 A | 4/2000 | Collins et al. |
| 6,270,649 B1 | 8/2001 | Zeikus et al. |
| 2001/0028977 A1 | 10/2001 | Kazacos et al. |
| 2003/0152823 A1 | 8/2003 | Heller |
| 2004/0028203 A1 | 2/2004 | Wurster et al. |
| 2004/0028992 A1 | 2/2004 | Jaouen |
| 2004/0137297 A1 | 7/2004 | Matsuoka et al. |
| 2005/0074653 A1 | 4/2005 | Broman |
| 2005/0112055 A1 * | 5/2005 | Shannon et al. ......... 423/594.13 |
| 2005/0158618 A1 | 7/2005 | Liberatore et al. |
| 2005/0244707 A1 | 11/2005 | Skyllas-Kazacos et al. |
| 2006/0012637 A1 | 1/2006 | Furukawa et al. |
| 2006/0024539 A1* | 2/2006 | Dumesic et al. ................ 429/17 |
| 2006/0088750 A1 | 4/2006 | Nobuta |
| 2006/0134493 A1 | 6/2006 | Yoshida et al. |
| 2006/0216565 A1 | 9/2006 | Cooray et al. |
| 2007/0078052 A1 | 4/2007 | Grinberg et al. |
| 2007/0122689 A1 | 5/2007 | Kubo et al. |
| 2007/0131546 A1 | 6/2007 | Nomoto et al. |
| 2008/0274385 A1 | 11/2008 | Creeth |
| 2009/0308752 A1 | 12/2009 | Evans et al. |
| 2009/0325002 A1 | 12/2009 | Creeth et al. |
| 2010/0112388 A1 | 5/2010 | Creeth et al. |
| 2010/0112393 A1 | 5/2010 | Creeth et al. |
| 2010/0297522 A1 | 11/2010 | Creeth et al. |
| 2011/0014532 A1 | 1/2011 | Knuckey et al. |
| 2011/0027671 A1 | 2/2011 | Knuckey et al. |
| 2011/0039170 A1 | 2/2011 | Creeth et al. |
| 2011/0091746 A1 | 4/2011 | Knuckey et al. |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 790 658 | 8/1997 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 0913638.3 | 8/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 01/73881 | 10/2001 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO 2007/110663 | 10/2007 |
| WO | WO 2007/122431 | 11/2007 |
| WO | WO 2008/009992 | 1/2008 |
| WO | WO 2008/009993 | 1/2008 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |
| WO | WO 2011/015875 | 2/2011 |

OTHER PUBLICATIONS

I. Bernal et al., "Iron(II) Complexes of Polydentate Aminopyridyl Ligands and an Exchangeable Sixth Ligand; Reactions with peroxides . . . " J. Chem. Soc., Dalton. Trans., 1995, 3667-3675.

Chang, et al., "Synthesis and Characterization of Bis(d-2-pyridylmethanamine)ruthenium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127, 2004, 112-126.

W. R. Harris et al., "Chelating Tendencies of Pyridyl-Containing Polyamines and Oxygenation of the Cobaltous Complexes," Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

Limoges, B.R. et al. "Electrocatalyst materials for fuel cells based on the polyoxometalates [PMo(12-n) Vn040]<(3+n)->(n=0-3)", Electrochimica Acta, Elsevier Scient Publishers, Barking, GB, vol. 50, No. 5, Jan. 15, 2005pp. 1169, 1170, 1176-1179.

M. Lubben et al., "Nonheme Iron Centers in Oxygen Activation: Characterization of an Iron(III) Hydroperoxide Intermediate," Angew. Chem. Int. Engl., 34, 1995, 1512-1514.

D. L. Reger et al., "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-225.

(56) References Cited

OTHER PUBLICATIONS

H. Sato et al., "Convenient Synthesis of N,N,N',N'- Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and Its Derivatives," Chem. Pharm. Bull., 48, 2000, 1514-1518.

M. Van den Heuval et al., "Synthesis of a Non-Heme Template for Attaching Four Peptides: An Approach to Artificial Iron(II)-Containing Peroxidases," J. Organ. Chem., 69, 2004, 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

\* cited by examiner

REDOX FUEL CELLS WITH A CATHOLYTE SOLUTION CONTAINING A POLYOXOMETALLATE

CROSS-REFERENCE TO RELATED APPLICATIONS

This Application is the US National Phase under 35 U.S.C. §371 of International Application No. PCT/GB2007/050151, filed Mar. 23, 2007, which was published in English as International Publication No. WO 2007/110663 A2 on Oct. 4, 2007, and claims the benefit of GB 0605878.8, filed Mar. 24, 2006.

FIELD

The present invention relates to fuel cells, in particular to indirect or redox fuel cells which have applications in microfuel cells for electronic and portable electronic components, and also in larger fuel cells for the automotive industry and for stationary applications. The invention also relates to certain catholyte solutions for use in such fuel cells.

DESCRIPTION OF THE RELATED ART

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode.

There are several types of fuel cell characterised by their different electrolytes. The liquid electrolyte alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysis of the oxygen reduction reaction. In addition expensive noble metal electrocatalysts are often used.

U.S. Pat. No. 3,152,013 discloses a gaseous fuel cell comprising a cation-selective permeable membrane, a gas permeable catalytic electrode and a second electrode, with the membrane being positioned between the electrodes and in electrical contact only with the gas permeable electrode. An aqueous catholyte is provided in contact with the second electrode and the membrane, the catholyte including an oxidant couple therein. Means are provided for supplying a fuel gas to the permeable electrode, and for supplying a gaseous oxidant to the catholyte for oxidising reduced oxidant material. The preferred catholyte and redox couple is HBr/KBr/$Br_2$. Nitrogen oxide is disclosed as a preferred catalyst for oxygen reduction, but with the consequence that pure oxygen was required as oxidant, the use of air as oxidant requiring the venting of noxious nitrogen oxide species.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

According to U.S. Pat. No. 3,540,933, certain advantages could be realised in electrochemical fuel cells by using the same electrolyte solution as both catholyte and anolyte. This document discloses the use of a liquid electrolyte containing more than two redox couples therein, with equilibrium potentials not more than 0.8V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidized state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(V)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{12}V_2O_{40}$.

Besides U.S. Pat. No. 4,396,687, a number of other attempts to use oxometallate catalysts have been made. For example, in U.S. Pat. No. 5,298,343, cathode systems comprising solid metal catalysts, oxometallates and metallic acids, such as molybdic acid are disclosed.

In addition, WO 96/31912 describes the use of embedded polyoxometallates in an electrical storage device. The redox nature of the polyoxometallate is employed in conjunction with carbon electrode material to temporarily store electrons.

US 2005/0112055 discloses the use of polyoxometallates for catalysing the electrochemical generation of oxygen from water. GB 1176633 discloses a solid molybdenum oxide anode catalyst.

US 2006/0024539 discloses a reactor and a corresponding method for producing electrical energy using a fuel cell by selectively oxidising CO at room temperature using polyoxometallate compounds and transition metal compounds over metal-containing catalysts.

EP-A-0228168 discloses activated carbon electrodes which are said to have improved charge storage capacity due to the adsorption of polyoxometallate compounds onto the activated carbon.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; they have not found practical, commercial utility in portable applications such as automotive and portable electronics.

SUMMARY

It is an object of the present invention to overcome or ameliorate one or more of the aforesaid disadvantages. It is a further object of the present invention to provide an improved catholyte solution for use in redox fuel cells.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a polyoxometallate redox couple being at least partially reduced at the cathode in operation of the cell, and at least partially regenerated by reaction with the oxidant after such reduction at the cathode, the catholyte solution comprising at least about 0.075M of the said polyoxometallate.

Also provided in accordance with the invention is a catholyte solution for use in such a redox fuel cell, the solution comprising at least about 0.075M of a polyoxometallate.

The polyoxometallate may be represented by the formula:

$$X_a[Z_bM_cO_d]$$

wherein:
X is selected from hydrogen, alkali metals, alkaline earth metals, ammonium and combinations of two or more thereof;
Z is selected from B, P, S, As, Si, Ge, Ni, Rh, Sn, Al, Cu, 1, Br, F, Fe, Co, Cr, Zn, $H_2$, Te, Mn and Se and combinations of two or more thereof;
M is a metal selected from Mo, W, V, Nb, Ta, Mn, Fe, Co, Cr, Ni, Zn, Rh, Ru, Tl, Al, Ga, In and other metals selected from the $1^{st}$, $2^{nd}$ and $3^{rd}$ transition metal series and the lanthanide series, and combinations of two or more thereof;
a is a number of X necessary to charge balance the $[M_cO_d]$ anion;
b is from 0 to 20;
c is from 1 to 40; and
d is from 1 to 180.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

Vanadium and molybdenum, and combinations thereof, are particularly preferred for M.

Phosphorus is particularly preferred for Z.

A combination of hydrogen and an alkali metal and/or alkaline earth metal is particularly preferred for X. One such preferred combination is hydrogen and sodium.

Specific examples of polyoxometallates include molybdophosphoric acid, $H_3PMo_{12}O_{40}$ 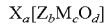 and molybdovanadophosphoric acid, $H_5PMo_{10}V_2O_{40}$.

In a preferred embodiment of the present invention, the polyoxometallate comprises vanadium, more preferably vanadium and molybdenum. Preferably the polyoxometallate comprises from 2 to 4 vanadium centres. Thus, particularly preferred polyoxometallates include $H_3Na_2PMo_{10}V_2O_{40}$, $H_3Na_3PMo_9V_3O_{40}$, or $H_3Na_4PMo_8V_4O_{40}$ and compounds of intermediate composition. In addition, a mixture of these or other polyoxometallate catalysts is also envisaged. For this embodiment, preferably, at least one X is hydrogen. However, it is also preferred that not all X be hydrogen. More preferably, at least two of X are not hydrogen. X comprising at least one hydrogen and at least one other material selected from alkali metals, alkaline earth metals, ammonium and combinations of two or more thereof is preferred.

The concentration of the polyoxometallate in the catholyte solution is preferably at least about 0.08M, more preferably at least about 0.1M, still more preferably at least about 0.125M and most preferably at least about 0.15M.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated trifluorostyrene, sulphonated copolymers based on α, β, β triflurostyrene monomer, radiation-grafted membranes. Non-fluorinated membranes include sulphonated poly(phenylquinoxalines), poly(2,6diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl sulphonic acid siloxane (PBSS).

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution In the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials from passing therethrough from the cathode side to the anode side thereof, although in this case anionic materials may pass from the cathode side of the anionic-selective membrane to the anode side thereof, whereupon they may combine with protons passing through the membrane in the opposite direction. Preferably the anion selective membrane is selective for hydroxyl ions, and combination with protons therefore yields water as product.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprises one or more perforations in the cation selective membrane, allowing such flushing directly through the membrane. Alternatively means may be provided for channelling flushed materials around the cation selective membrane from the interstitial space to the cathode side of the said membrane.

According to another aspect of the present invention, there is provided a method of operating a proton exchange membrane fuel cell comprising the steps of:
a) forming H$^+$ ions at an anode situated adjacent to a proton exchange membrane;
b) supplying the catholyte of the invention with its redox couple in an oxidised state to a cathode situated oppositely adjacent to the proton exchange membrane; and
c) allowing the catalyst to become reduced upon contact with the cathode concomitantly with H$^+$ ions passing through the membrane to balance charge.

In a preferred embodiment, the catholyte is supplied from a catholyte reservoir.

The method of the above fourth aspect may additionally comprise the step of:
d) passing the catholyte from the cathode to a reoxidation zone wherein the catalyst is reoxidised.

In an especially preferred embodiment, the method of the above aspect comprises the step of:
e) passing the catholyte from the reoxidation zone to the catholyte reservoir.

In this embodiment, the cell is cyclic and the catalyst in the cathode can be repeatedly oxidised and reduced without having to be replaced.

The fuel cell of the invention may comprise a reformer configured to convert available fuel precursor such as LPG, LNG, gasoline or low molecular weight alcohols into a fuel gas (eg hydrogen) through a steam reforming reaction. The cell may then comprise a fuel gas supply device configured to supply the reformed fuel gas to the anode chamber It may be desirable in certain applications of the cell to provide a fuel humidifier configured to humidify the fuel, eg hydrogen. The cell may then comprise a fuel supply device configured to supply the humidified fuel to the anode chamber.

An electricity loading device configured to load an electric power may also be provided in association with the fuel cell of the invention.

Preferred fuels include hydrogen, metal hydrides (for example borohydride which may act as a fuel itself or as a provider of hydrogen), ammonia, low molecular weight alcohols, aldehydes and carboxylic acids, sugars and biofuels as well as LPG, LNG, or gasoline.

Preferred oxidants include air, oxygen and peroxides

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple flowing in solution in the cathode chamber in operation of the cell is used in the invention as a catalyst for the reduction of oxygen in the cathode chamber, in accordance with the following (wherein Sp is the redox couple species).

$$O_2 + 4Sp_{red} + 4H^+ \rightarrow 2H_2O + 4Sp_{ox}$$

The polyoxometallate redox couple, and any other ancillary redox couple, utilised in the fuel cell of the invention should be non-volatile, and is preferably soluble in aqueous solvent. Preferred redox couples should react with the oxidant at a rate effective to generate a useful current in the electrical circuit of the fuel cell, and react with the oxidant such that water is the ultimate end product of the reaction.

The fuel cell of the invention requires the presence of at least about 0.1M of a polyoxometallate species in the catholyte solution. However, in some circumstances it may also be possible to include other redox couples in the catholyte solution in addition to the polyoxometallate species. There are many suitable examples of such ancillary redox couples, including ligated transition metal complexes and other polyoxometallate species. Specific examples of suitable transition metals ions which can form such complexes include manganese in oxidation states II-V, Iron I-IV, copper I-III, cobalt I-III, nickel I-III, chromium (II-VII), titanium II-IV, tungsten IV-VI, vanadium II-V and molybdenum II-VI. Ligands can contain carbon, hydrogen, oxygen, nitrogen, sulphur, halides, phosphorus. Ligands may be chelating complexes include Fe/EDTA and Mn/EDTA, NTA, 2-hydroxyethylenediaminetriacetic acid, or non-chelating such as cyanide.

In some cases, it may be preferable however to avoid the presence in the catholyte solution of the invention of any mediator, and to rely on the redox behaviour of the polyoxometallate material(s) alone.

The fuel cell of the invention may operate straightforwardly with a redox couple catalysing in operation of the fuel cell the reduction of oxidant in the cathode chamber. However, in some cases, and with some redox couples, it may be necessary and/or desirable to incorporate a catalytic mediator in the cathode chamber.

Various aspects of the present invention will now be more particularly described with reference to the following figures which illustrate embodiments of the present invention:

DETAILED DESCRIPTION

Figure 1:
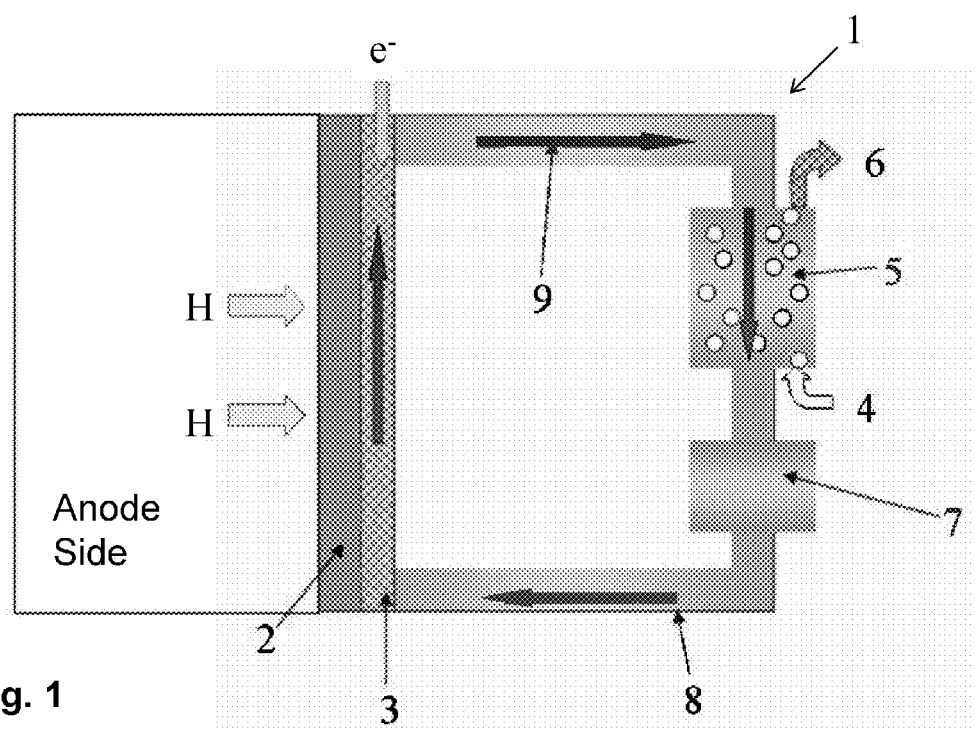
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (eg water and heat) can be discharged.

A catholyte solution comprising the oxidised form of the polyoxometallate redox catalyst is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

A comparative test highlighting the improved performance of the catholyte of the present invention over prior art catholytes was performed as described in the following example.

Example 1

Two catholyte solutions according to the present invention were prepared. The first, $H_3Na_2PMo_{10}V_2O_{40}$ (INV 1), included two vanadium atoms and the second, $H_3Na_2PMo_9V_3O_{40}$ (INV 2) included three vanadium atoms.

In addition, two catholyte solutions based on the disclosure of U.S. Pat. No. 4,396,687 were prepared. The first, PA1, comprised a mediator, namely 0.8M vanadium (IV) sulphate and a catalyst including two vanadium atoms, namely 0.055M $H_5PMo_{12}V_2O_{40}$. Oxygen was bubbled through PA1 for two hours to oxidise the vanadium in the mediator to a +5 oxidation state.

The second, PA2, was prepared in exactly the same way as PA1, except that the catalyst included three vanadium atoms, $H_5PMo_9V_3O_{40}$, instead of only two.

The performance of these four catholytes was compared using a redox regenerative cathode and a hydrogen anode. A commercial anode was used with a platinised gas diffusion layer from E-TEK (De Nora Deutschland), ½ MEA from Ion Power Inc using a 125 mm Nafion® (DuPont) membrane. To allow direct comparison between the systems, the same flow rates of hydrogen and oxygen were used. The catholyte and cell temperature was also kept at the same temperature for all the measurements.

A reticulated vitreous carbon (RVC) electrode was used for the cathode. The catholyte solutions were pumped through this electrode before passing to a heated reservoir where oxygen was bubbled through the solution to allow reoxidation to occur. The total liquid volume was 500 cm³. The cathode was assembled as shown in Figure. The membrane assembly was then placed on top of the cathode assembly and an anode arrangement (similar to the cathode arrangement) was placed on the other side of the membrane to complete the cell.

By applying varying loads across the cell, it was possible to establish the maximum current that could be drawn from the cell, whilst achieving a sufficient rate of regeneration to maintain cell operation indefinitely. The maximum current densities are given in Table 1.

TABLE 1

| Catholyte | PA1 | PA2 | INV1 | INV2 |
|---|---|---|---|---|
| Current Density (mA/cm$^2$) | 85.7 | 115.3 | 122.9 | 430.6 |

It can clearly be seen that INV1 and INV2 can sustain a much higher operating current than the prior art catholytes.

Figure 2:
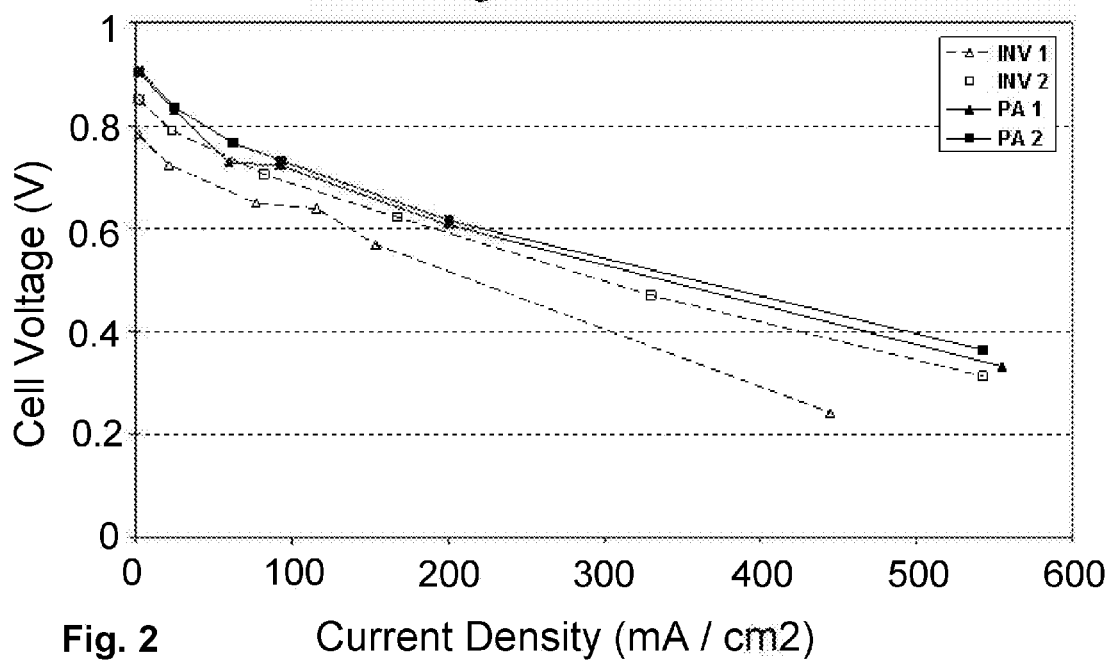
FIG. 2 shows the results of certain comparative tests between fuel cells of the present invention and of the prior art.

FIG. 2 shows that INV1 and INV2 maintain comparable cell voltages and current densities with the prior art catholytes. Although the cell operating voltage of INV2 is slightly lower than the prior art catholytes, due to the rapid re-oxidation rates achievable by INV2 (and INV1), the catholytes of the present invention provide a massive increase in the range of sustainable current that can be drawn from the cell.

Figure 3:
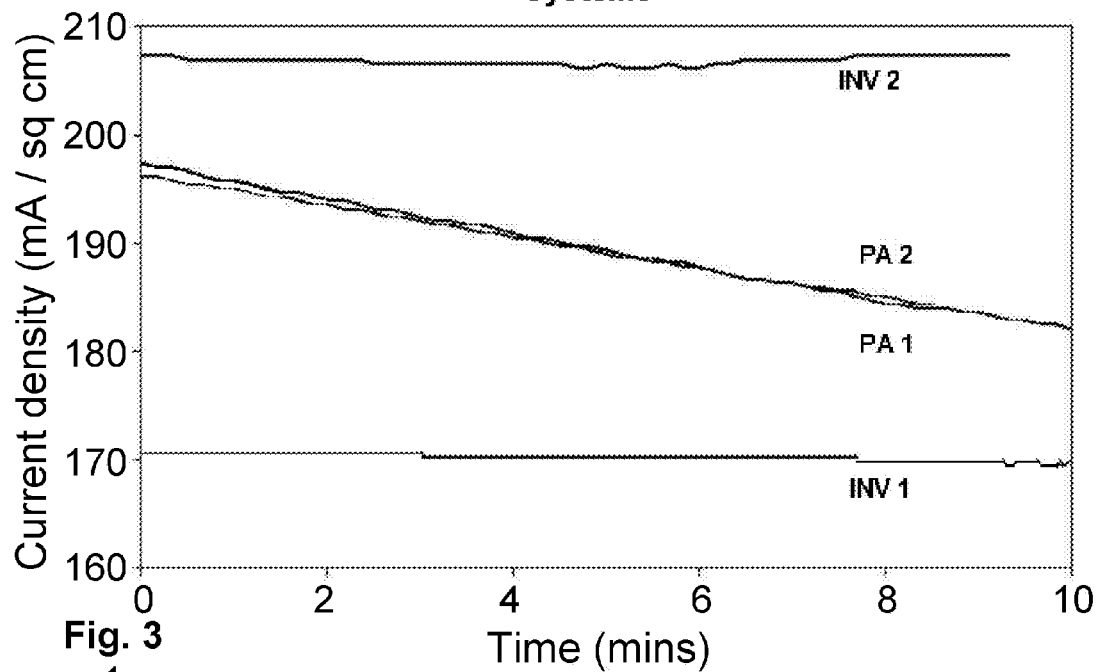
FIG. 3 shows further comparative data demonstrating the stability of current density over time achievable with fuel cells in accordance with the invention.

FIG. 3 further demonstrates that fuel cells in accordance with the invention are capable of maintaining current density in operation of the cell over time to an improved extent with regard to the comparative examples.

Example 2

Effect of Concentration of Polyoxometallate

The cell used was identical for all experiments, utilising an ion-power Nafion 115 MEA with 100 ppi RVC cathode, operating at 75° C.

Figure 4:
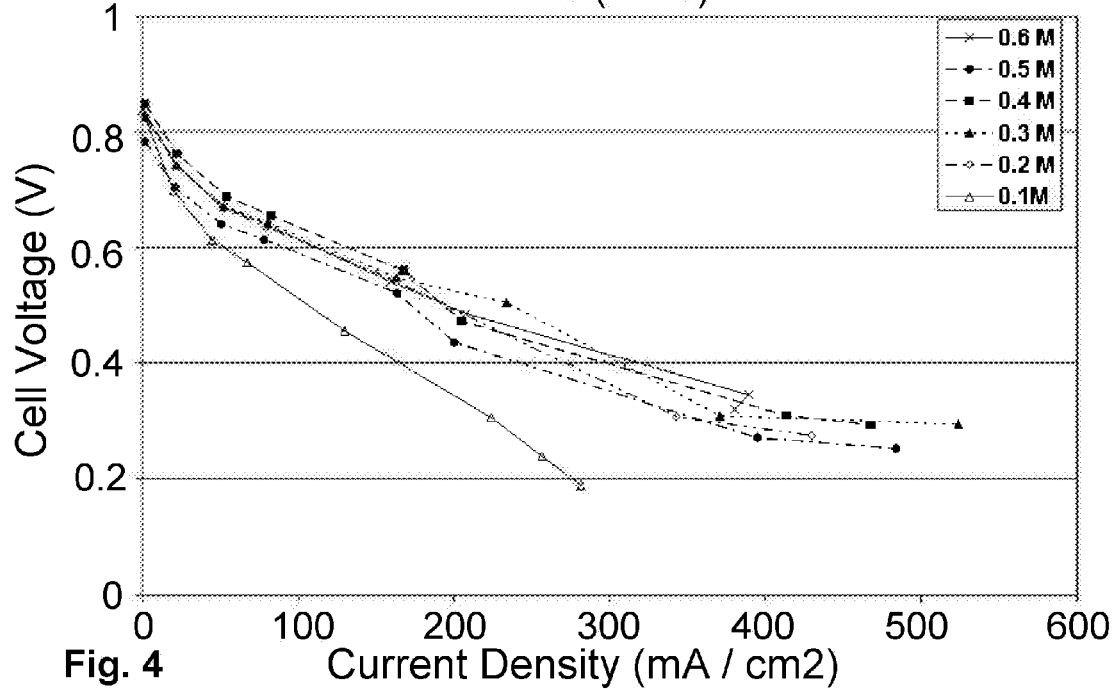
FIG. 4 shows data demonstrating the effect of increasing polyoxometallate concentration in a $V_3$ catholyte system according to the invention.
Figure 5:
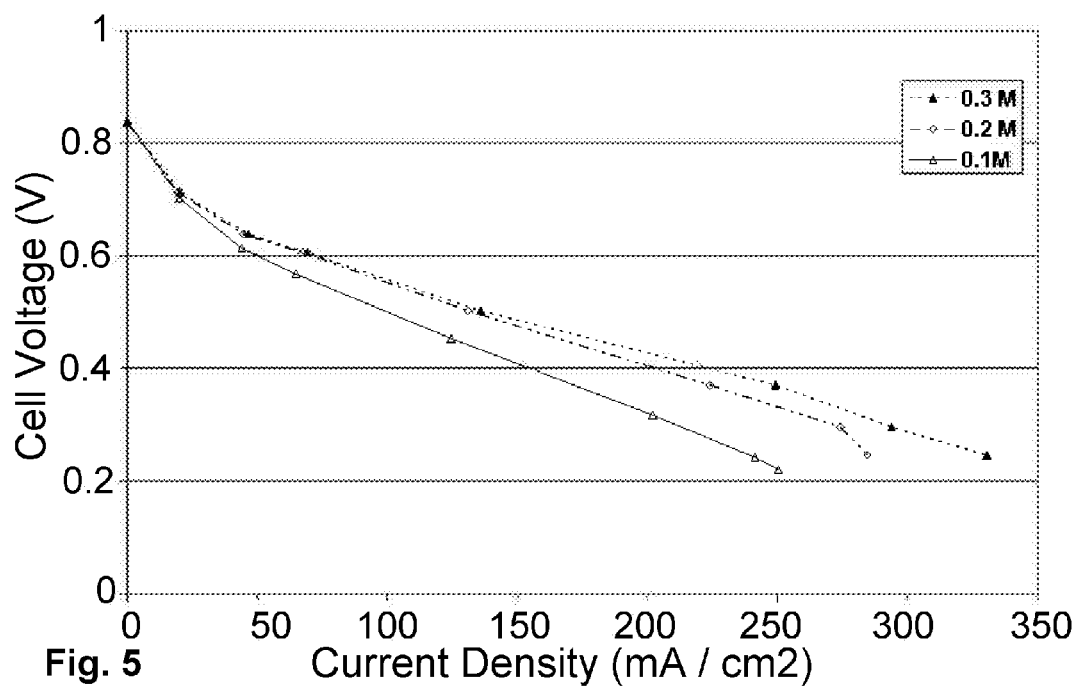
FIG. 5 shows data demonstrating the effect of increasing polyoxometallate concentration in a $V_4$ catholyte system according to the invention.

The electrochemical performance of different concentrations of polyoxometallate systems according to the invention was tested. The polyoxometallate catholytes were $H_3Na_3PMo_9V_3O_{40}$ ($V_3$ polyoxometallate) and $H_3Na_4PMo_8V_4O_{40}$ ($V_4$ polyoxometallate). The current-voltage plots for V3 and V4 respectively can be seen in FIGS. 4 and 5. For both the $V_3$ and $V_4$ polyoxometallates, little difference can been seen in the performance above 0.2M concentration. However, both polyoxometallates exhibit significantly lower performance at 0.1M concentration. The effective lower limit for POM concentration in catholyte solutions according to the invention may be different for different polyoxometallate systems, but it is considered that 0.075M represents the lower limit for POM concentration in catholyte solutions according to the invention.

Example 3

Different Vanadium Content Polyoxometallates

This data shows the electrochemical and regenerative performance comparisons of the different Vanadium-content polyoxometallates according to the invention. The polyoxometallates used were as follows:

| | |
|---|---|
| $H_3 Na_2 V_2$ polyoxometallate: | 0.3M $H_3Na_2PMo_{10}V_2O_{40}$ |
| $H_3 Na_3 V_3$ polyoxometallate: | 0.3M $H_3Na_3PMo_9V_3O_{40}$ |
| $H_3 Na_4 V_4$ polyoxometallate: | 0.3M $H_3Na_4PMo_8V_4O_{40}$ |
| $H_3 Na_5 V_5$ polyoxometallate: | 0.3M $H_3Na_5PMo_7V_5O_{40}$ |

The cell used was identical for all experiments, utilising an ion-power Nafion 115 MEA with 100 ppi RVC cathode, operating at 75° C. Air was used to regenerate the catholytes at a flow rate of 1000 ml/min.

Figure 6:
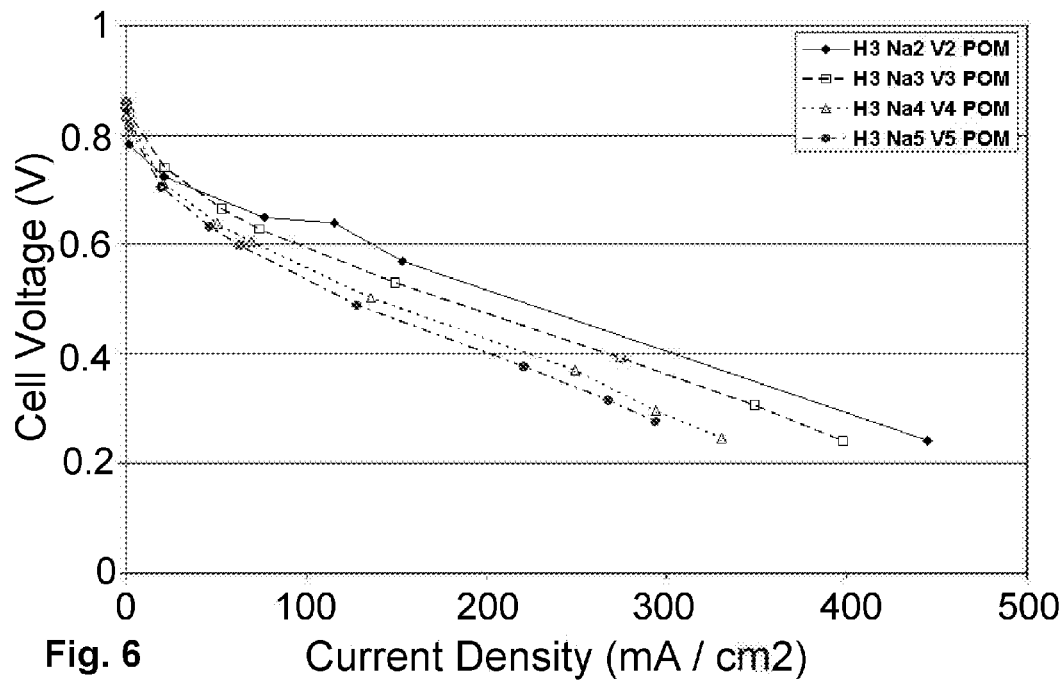
FIG. 6 shows the IV curves for catholyte solutions in accordance with the invention with polyoxometallates of differing vanadium content.

The IV curves for the above polyoxometallate systems can be seen in FIG. 6. It can be seen that the electrochemical performance of the polyoxometallates lies in the order $V_2 \rightarrow V_5$, with $V_2$ polyoxometallate exhibiting the strongest performance.

The cell was discharged through a 0.0194 Ohm resistor with each of the polyoxometallate systems. The current density sustained was recorded to monitor the regenerative characteristic of the polyoxometallate systems, a well-performing polyoxometallate system would be able to sustain a constant high current. During the test, it was observed that the $V_5$ polyoxometallate started precipitating during use. This precipitate then proceeded to block up the flow system. Obviously this makes this particular $V_5$ system unsuitable for use in these applications.

Figure 7:
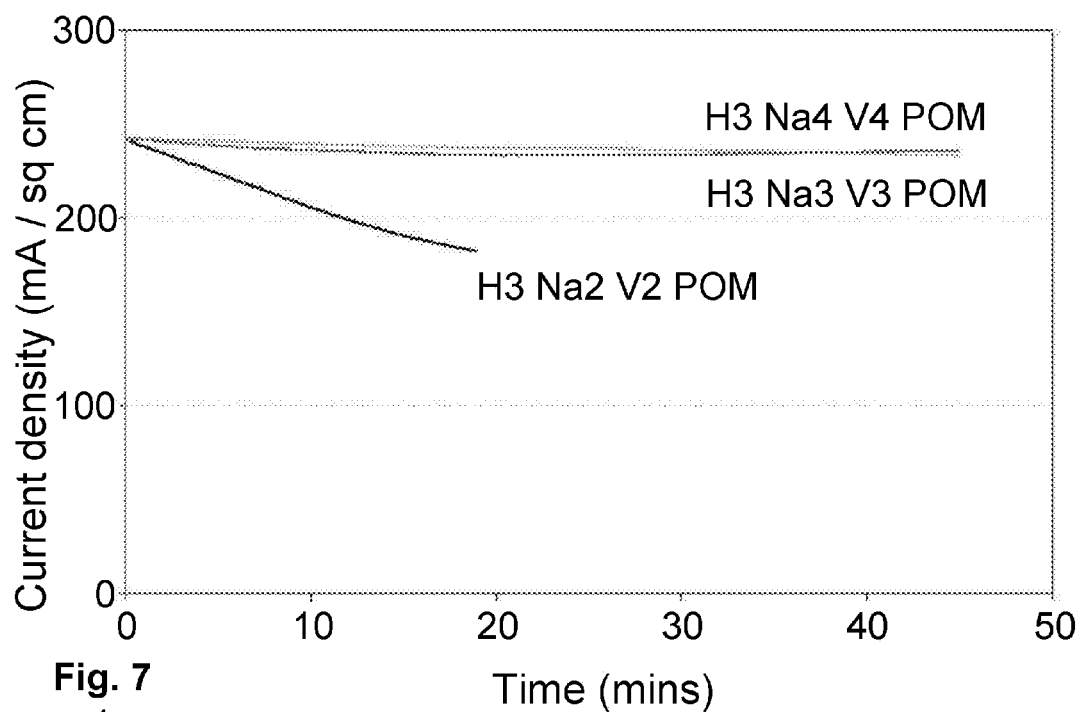
FIG. 7 shows further performance data for three of the better performing systems from FIG. 6.

The performance data for the remaining three systems is shown in FIG. 7. As can clearly be seen, both the $V_3$ and $V_4$ systems could maintain a steady current throughout the length of the test. The $V_2$ polyoxometallate system started to fall immediately and the experiment was halted prematurely to prevent the polyoxometallate from becoming over-reduced.

Example 5

Acidic Versions of Catholytes

Acidified versions of $V_3$ and $V_4$ polyoxometallates were prepared by ion-exchanging sodium ions for protons. A slight excess of ion exchange resin (Dowex-50) was used in the exchange, aiming to exchange all of the Na$^+$ ions for H$^+$ ions. To ensure a significant level of ion exchange, this procedure was carried out twice. The level of ion-exchange was determined by titrating the exchanged polyoxometallates with NaOH to determine how much sodium is required to neutralise the polyoxometallate solution. An all-protonated version of $V_2$ polyoxometallate was synthesised directly from the constituent Vanadium and Molybdenum oxides. An all-sodium version of $V_4$ polyoxometallate was synthesised directly from the vanadium and molybdenum oxides as well as sodium carbonate.

The different polyoxometallate catholytes used were as follows:

| | |
|---|---|
| $H_3 Na_2 V_2$ polyoxometallate: | 0.3M $H_3Na_2PMo_{10}V_2O_{40}$ |
| $H_5 V_2$ polyoxometallate: | 0.3M $H_5PMo_{10}V_2O_{40}$ |
| $H_3 Na_3 V_3$ polyoxometallate: | 0.3M $H_3Na_3PMo_9V_3O_{40}$ |
| $H_{4.5} Na_{1.5} V_3$ polyoxometallate: | 0.3M $H_{4.5}Na_{1.5}PMo_9V_3O_{40}$ |
| $H_3 Na_4 V_4$ polyoxometallate: | 0.3M $H_3Na_4PMo_8V_4O_{40}$ |
| $H_5 Na_2 V_4$ polyoxometallate: | 0.3M $H_5Na_2PMo_8V_4O_{40}$ |
| $Na_7 V_4$ polyoxometallate: | 0.3M $Na_7PMo_8V_4O_{40}$ |

As with the other sets of experiments, the cell utilised an ion-power Nafion 115 MEA with 100 ppi RVC cathode, operating at 75° C.

Figure 8:
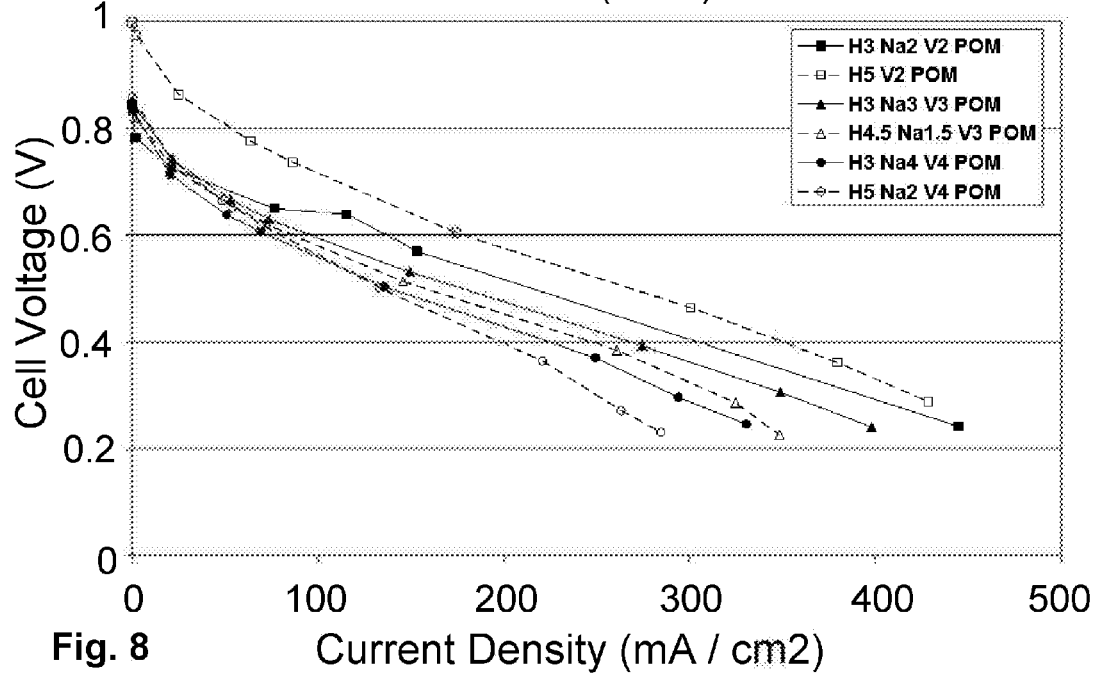
FIG. 8 shows electrochemical performance differences between catholyte solutions according to the invention with polyoxometallates of differing acid content.

The current-voltage plot shown in FIG. 8 shows the electrochemical performance differences between the polyoxometallates with 3 protons per polyoxometallate ion and those with increased acidity. The IV data for the $H_5V_2$ polyoxometallate is not directly comparable to the other data, as this data was taken from freshly-synthesised polyoxometallate, whereas all other data was taken from polyoxometallate that had been previously reduced and reoxidised back to its maximum oxidation level (which is always lower than that of freshly-synthesised polyoxometallate). It was impossible to do this with the $H_5V_2$ polyoxometallate, as it would not re-oxidise at all.

Figure 9:
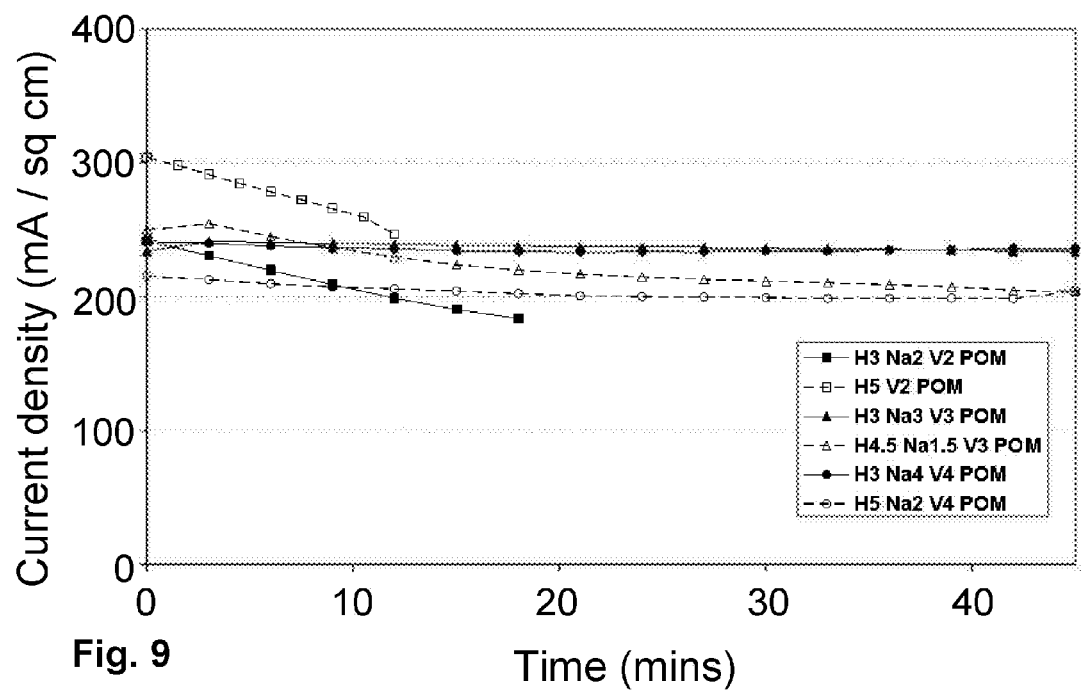
FIG. 9 shows further performance data for the catholyte solutions of FIG. 8.

It can be seen from FIG. 9 that for both $V_3$ and $V_4$ polyoxometallates the versions with higher proton concentration do not maintain as high a current density as the polyoxometallates with higher $Na^+$ content. The acidified $V_4$ polyoxometallate does maintain a (lower) steady current, and it appears that the acidified $V_3$ polyoxometallate is heading towards a steady-state point. Neither the acidified nor the mixed-ion $V_2$ polyoxometallates can sustain this current density, but the mixed-ion $V_2$ polyoxometallate was able to regenerate when back at open-circuit.

Figure 10:
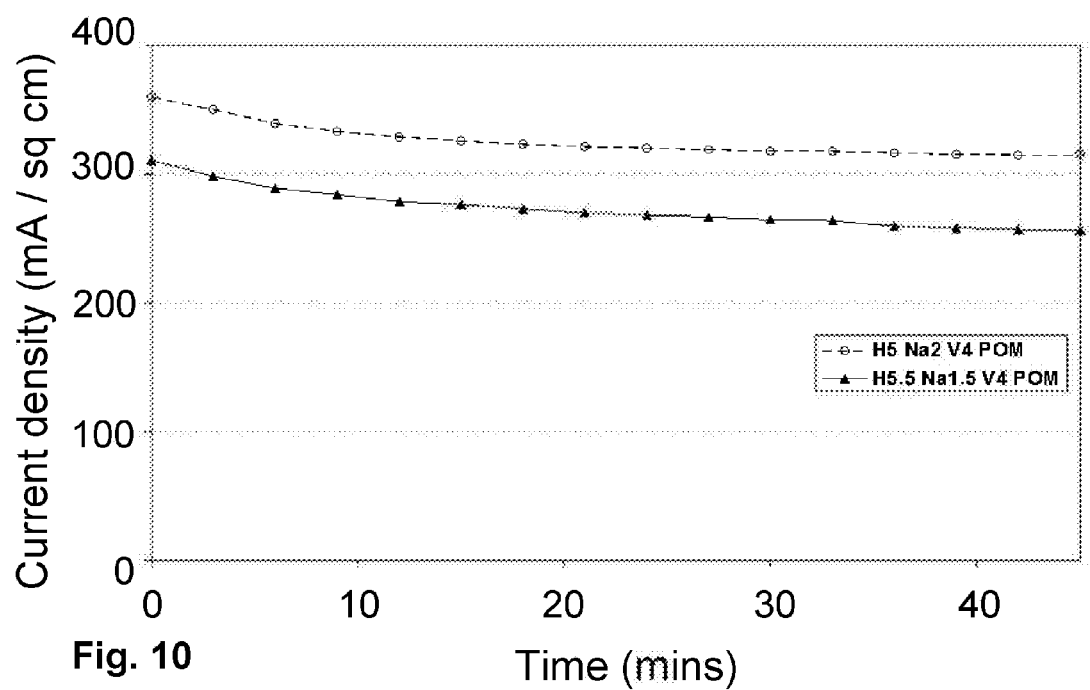
FIG. 10 shows further performance data for catholyte solutions of the $V_4$ polyoxometallate of different acid content.

FIG. 10 shows data under similar conditions as for FIG. 9, except that the load was reduced to $0.0033\Omega$ to obtain higher currents for $H_5Na_2V_4$ polyoxometallate: 0.3M $H_5Na_2PMo_8V_4O_{40}$ compared with $H_{5.5}Na_{1.5}V_4$ polyoxometallate: 0.3M $H_{5.5}Na_{1.5}PMo_8V_4O_{40}$. The latter system was perepared by ion exchanging five times using the procedure described above. Under the conditions of FIG. 10, the higher acid content polyoxometalate polymer regenerates with air at a lower rate reducing the current available.

It is clear that overly increased proton content, in particular where the counterions are solely protons, in these vanadium polyoxometallates can lead to poorer performance due to the slower regeneration reaction with oxygen from air, and indeed the fully proton counterion $V_2$ polyoxometallate has an extremely slow regeneration rate.

Figure 11:
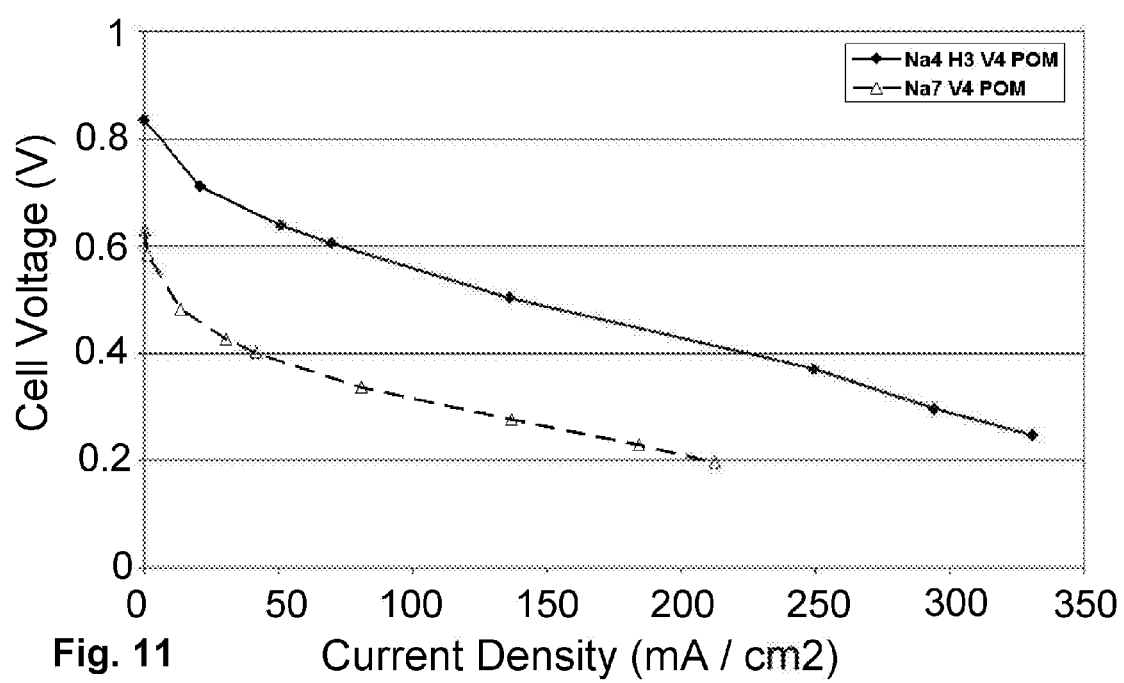
FIG. 11 shows the current/voltage characteristics of an all-sodium ($Na_7$) $V_4$ polyoxometallate compared to the $Na_4H_3V_4$ polyoxometallate.

The "Na7 polyoxometallates" chart in FIG. 11 shows the current/voltage characteristics of the all-sodium ($Na_7$) $V_4$ polyoxometallate compared to the $Na_4H_3V_4$ polyoxometallate. It can be seen that the electrochemical performance of the all-sodium version is inferior to that of the mixed counterion polyoxometallate, making it somewhat less suitable for use in the fuel cell of the invention.

The invention claimed is:

1. A redox fuel cell comprising:
    a fuel for the redox fuel cell;
    an anode region comprising an anode and a cathode region comprising a cathode, said regions being separated by an ion selective polymer electrolyte membrane;
    a fuel passage through which the fuel is supplied to the anode region of the cell;
    an oxidant inlet that supplies an oxidant to the cathode region of the cell;
    an electrical circuit between the anode and the cathode; and
    a non-volatile catholyte solution flowing fluid communication with the cathode, the catholyte solution comprising at least about 0.1M of a polyoxometallate, wherein the polyoxometallate of the catholyte solution is not present in the fuel, and wherein the polyoxometallate is at least partially reduced at the cathode in operation of the cell, and at least partially regenerated by reaction with the oxidant after such reduction at the cathode.

2. A redox fuel cell according to claim 1 wherein the concentration of the polyoxometallate in the catholyte solution is over 0.15M.

3. A redox cell according to claim 1 wherein the catholyte solution is substantially free from any ancillary redox species.

4. A redox fuel cell according to claim 1 wherein the catholyte solution comprises at least one ancillary redox species.

5. A redox fuel cell according to claim 4 wherein the ancillary redox species is selected from ligated transition metal complexes, further polyoxometallate species, and combinations thereof.

6. A redox fuel cell according to claim 5 wherein the transition metal(s) in the transition metal complexes is/are selected from the group consisting of: manganese in oxidation states II-V, Iron I-IV, copper I-III, cobalt I-III, nickel I-III, chromium (II-VII), titanium II-IV, tungsten IV-VI, vanadium II-V and molybdenum II-VI.

7. A redox fuel cell according to claim 1 wherein the polyoxometallate is represented by the formula:

$$X_a[Z_bM_cO_d]$$

wherein:
    X is selected from the group consisting of: hydrogen, alkali metals, alkaline earth metals, and ammonium, and combinations of two or more thereof;
    Z is selected from the group consisting of: B, P, S, As, Si, Ge, Ni, Rh, Sn, Al, Cu, I, Br, F, Fe, Co, Cr, Zn, $H_2$, Te, Mn and Se, and combinations of two or more thereof;
    M is a metal selected from the group consisting of: Mo, W, V, Nb, Ta, Mn, Fe, Co, Cr, Ni, Zn, Rh, Ru, Tl, Al, Ga, In, metals selected from the 1st, 2nd and 3rd transition metal series, and the lanthanide series, and combinations of two or more thereof;
    a is a number of X necessary to charge balance the $[Z_bM_cO_d]$ anion;
    b is from 0 to 20;
    c is from 1 to 40; and
    d is from 1 to 180.

8. A redox fuel cell according to claim 7 wherein b is from 0 to 2.

9. A redox fuel cell according to claim 7 wherein c is from 5 to 20.

10. A redox fuel cell according to claim 7 wherein d is from 30 to 70.

11. A redox fuel cell according to claim 7 wherein M is selected from the group consisting of: vanadium, molybdenum, and combinations thereof.

12. A redox fuel cell according to claim 7 wherein Z is phosphorus.

13. A redox fuel cell according to claim 7 wherein X comprises a combination of hydrogen with alkali metal ions and/or alkaline earth metal ions.

14. A redox fuel cell according to claim 7 containing from 2 to 4 vanadium centres in the polyoxometallate.

15. A redox fuel cell according to claim 14 wherein at least one X is hydrogen.

16. A redox fuel cell according to claim 15 wherein X comprises at least one hydrogen and at least one other material selected from the group consisting of: alkali metals, alkaline earth metals, ammonium and combinations of two or more thereof.

17. A redox fuel cell according to claim 14 wherein the polyoxometallate comprises $H_3Na_2PMo_{10}V_2O_{40}$.

18. A redox fuel cell according to claim 14, wherein the polyoxometallate comprises $H_3Na_2PMo_9V_3O_{40}$.

19. A redox fuel cell according to claim 14 wherein the polyoxometallate comprises $H_3Na_4PMo_8V_4O_{40}$.

20. A method of generating electricity by the redox fuel cell of claim 1, comprising
    supplying the fuel to the anode region;
    supplying the oxidant to the cathode region; and
    generating electricity through the electrical circuit between the anode and the cathode.

* * * * *